C. F. Keller.
Locking Nut.
N° 89,586.    Patented May 4, 1869.
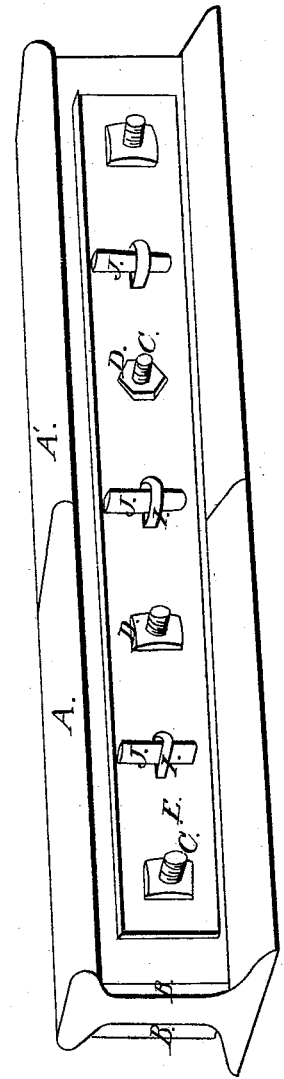
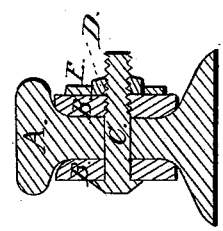
Witnesses:
R B Elliott
J L Cook
Inventor:
C. F. Keller

C. F. KELLER, OF NEVADA, OHIO, ASSIGNOR TO HIMSELF, WILLIAM BALLIET, AND H. A. KING, OF SAME PLACE.

Letters Patent No. 89,586, dated May 4, 1869.

IMPROVEMENT IN LOCKING-NUTS.

The Schedule referred to in these Letters Patent and making part of the same

*To all whom it may concern:*

Be it known that I, C. F. KELLER, of Nevada, in the county of Wyandot, and State of Ohio, have invented a new and improved Method of Preventing Nuts from Becoming Loose on Bolts Used in Coupling Railroad-Rails, &c.; and I do hereby declare that the following is a full and complete description of the same, reference being had to the accompanying drawings, making a part of this specification, in which—

Figure 1 is a perspective view.

Figure 2 is a cross-section.

Like letters refer to like parts.

The nature of this invention relates to an improved method of preventing nuts from becoming loose on bolts used in coupling railroad-rails, &c.; and consists of a plate, secured and fastened to each side of the rails, by means of bolts and nuts, in such a manner that the nuts will not become loose and turn on the bolts, as is usual, by means of the jar of the trains passing over the track.

In the drawings—

A represents a portion of a rail coupled to the rail A'.

On either side of these rails are placed the plates B B.

Extending through the rail and plates, with the head resting against the outside of one of the plates, are the bolts C, of which there may be more or less, as desired.

On the end of these bolts are secured the nuts D, as in the ordinary method of securing said plates.

It is well known that the jar of the trains passing over the track has a tendency to loosen the nuts, causing them to turn on the bolts, thus loosening the plates, causing much trouble and labor, to prevent which is the object of this invention, and is accomplished in the following manner:

E is a plate, provided with holes, made to fit over the nuts on the end of the bolts, as shown in fig. 2, and also with slots that allow the staples to pass through, which staples are firmly secured in the plate B.

When the plate E is in position, with the nuts fitting into the openings in said plate, the nuts are, by means of said openings, prevented from becoming loose.

To secure the plate E in place, and thus prevent the least possibility of the bolts getting loose, staples I are secured in the plate B, and extend through slots cut in the plate E for that purpose, through which staples are driven the pins J.

The staples are made of round iron, and in a short time will press or form a groove in the pins, and thus prevent them getting loose or coming out.

The nuts may be made hexagon or octagon, instead of square, so that in bringing them in line with the openings in the plate it will be necessary to turn them but little, and yet be tight.

The plate E may be made in two pieces, and the staples used more or less in number, as thought desirable.

By securing the bolts in the way herein described, there is no possibility of the rails uncoupling or being disjointed, as the staples and pins hold the plate E secure, and the openings in said plate that fit over the nuts prevent them from turning.

This method of securing nuts may be applied not only to railroad-rails, but any place where nuts and bolts are used.

A spring-key may be used instead of a wooden key in the staples, and the plate E may be made with notches to fit over the burrs, instead of holes, and held with staples, or in some other way.

What I claim as my improvement, and desire to secure by Letters Patent, is—

A plate, E, provided with a suitable number of holes, as described, in combination with the plate B, having one or more staples attached for securing the plate E in place, by means of the pins J, to prevent the nuts turning or becoming loose, as and for the purpose set forth.

C. F. KELLER.

Witnesses:
R. B. ELLIOTT,
J. L. COOK.